UNITED STATES PATENT OFFICE.

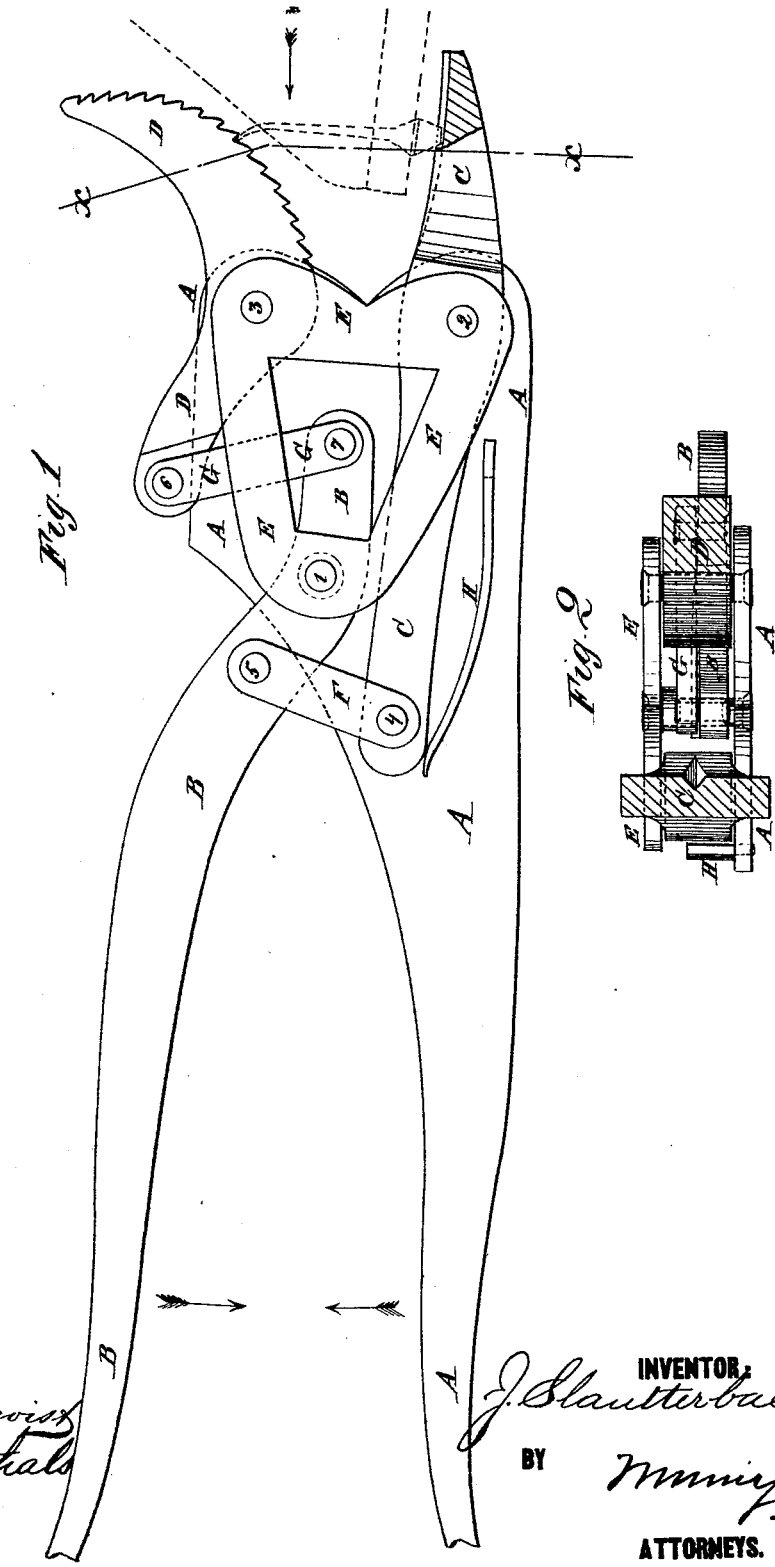

JACOB SLAUTTERBACK, OF MIFFLINTOWN, PENNSYLVANIA.

IMPROVEMENT IN HORSESHOE-NAIL CLINCHERS.

Specification forming part of Letters Patent No. 183,871, dated October 31, 1876; application filed August 28, 1876.

*To all whom it may concern:*

Be it known that I, JACOB SLAUTTERBACK, of Mifflintown, in the county of Juniata and State of Pennsylvania, have invented a new and useful Improvement in Horseshoe-Nail Clinchers, of which the following is a specification:

Figure 1 is a side view of my improved instrument. Fig. 2 is a detail section of the same taken through the line $x\,x$, Fig. 1.

Similar letters of reference indicate corresponding parts.

The object of this invention is to furnish an improved instrument for clinching the nails in shoeing horses, which shall be simple in construction, convenient in use, and effective in operation.

The invention consists in the combination of the two pivoted handles, the two pivoted jaws, the strengthening-plate, the pivoted connecting-bars, and the spring with each other, as hereinafter fully described.

A and B are the two handles, which are pivoted to each other by the rivet 1. The forward part of the handle A is widened into a plate, and to the lower and upper parts of its forward end are pivoted the jaws C D by the rivets 2 3. The face of the jaw C has a longitudinal groove formed in it to receive the heads of the nails. The jaw D is curved, as shown in Fig. 1, and in its face are formed teeth to take hold of the end of the nail and clinch it. The rivets 1 2 3 are strengthened by the triangular plate E, through which they pass, and upon which they are headed down. To the rear end of the jaw C is pivoted, by a rivet, 4, the end of a bar, F, the other end of which is pivoted by a rivet, 5, to the handle B, a little in the rear of its pivot 1. To the rear end of the jaw D is pivoted, by a rivet, 6, the end of a bar, G, the other end of which is pivoted by a rivet, 7, to the forward end of the handle B. The bars F G should be made double, so that the strain may come squarely upon their pivots.

By this construction, as the handles A B are pressed together, the jaw D, that rests upon the forward end of the nail, will be drawn downward, bending and clinching the nail. The jaws C D are held apart by a spring, H, attached to the lower forward part of the handle A, and the free end of which rests against the rear end of the jaw C, as shown in Fig. 1.

Having thus described my invention, I claim as new and desire to secure by Letters Patent—

The combination of the two pivoted handles, A B, the two pivoted jaws C D, the strengthening-plate E, the pivoted connecting-bars F G, and the spring H, with each other, substantially as herein shown and described.

JACOB SLAUTTERBACK.

Witnesses:
B. F. BURCHFIELD,
JOSEPH T. SMITH.